(12) United States Patent
Wojtunik

(10) Patent No.: US 6,211,978 B1
(45) Date of Patent: Apr. 3, 2001

(54) MULTI-CHANNEL WAVE DIVISION MULTIPLEXER SYSTEM

(75) Inventor: Henry John Wojtunik, Holmdel, NJ (US)

(73) Assignee: Anacom Systems, Inc., Piscataway, NJ (US)

(*) Notice: Subject to any disclaimer, the term of this patent is extended or adjusted under 35 U.S.C. 154(b) by 0 days.

(21) Appl. No.: 09/247,666

(22) Filed: Feb. 10, 1999

(51) Int. Cl.[7] .............................. H04B 10/24; H04J 14/02
(52) U.S. Cl. .......................... 359/114; 359/124; 359/127; 385/24
(58) Field of Search .................... 359/114, 113, 359/124, 127; 385/24, 15

(56) References Cited

U.S. PATENT DOCUMENTS

| | | | |
|---|---|---|---|
| 4,289,273 | 9/1981 | Sugimoto et al. | 350/96.16 |
| 4,736,359 | 4/1988 | Cohen et al. | 350/3 |
| 4,825,113 | 4/1989 | Sato et al. | 370/2 |
| 5,280,549 | 1/1994 | Barnard et al. | 385/15 |
| 5,712,936 * | 1/1998 | Hoag et al. | 385/24 |
| 5,740,289 | 4/1998 | Glance | 385/24 |
| 5,778,118 | 7/1998 | Sridhar | 385/24 |
| 5,801,858 | 9/1998 | Roberts | 359/114 |
| 5,909,294 * | 6/1999 | Doerr et al. | 359/114 |
| 6,031,645 * | 2/2000 | Ichikawa | 359/113 |

FOREIGN PATENT DOCUMENTS

| | | |
|---|---|---|
| 3010-802 | 9/1981 | (DE). |
| 62-274939 | 11/1987 | (JP). |

* cited by examiner

Primary Examiner—Kinfe-Michael Negash
(74) Attorney, Agent, or Firm—Kenneth Watov; Watov & Kipnes, P.C.

(57) ABSTRACT

In a multichannel wave division multiplexer system the simultaneous bidirectional transmission through a single optical fiber of at least first and second optical signals each having a first wavelength is provided by electrically isolating each respective optical transmitter from the optical signal of the other optical transmitter.

18 Claims, 9 Drawing Sheets

TWO CHANNEL WDM SYSTEM

MULTI-CHANNEL WAVE DIVISION MULTIPLEXER SYSTEM

FIELD OF THE INVENTION

The present invention relates generally to fiber optic communication systems, and more particularly to the bidirectional transmission of two or more modulated light signals over the same fiberoptic fiber at the same time.

BACKGROUND OF THE INVENTION

It is known in the art to simultaneously transmit two channels of light modulated signals over a single fiber in a fiberoptic communication system. For example, it is known to use a 1.3/1.5 micrometer wave division multiplexer (WDM) to combine or separate the two light modulated signals, whereby one is generated by a 1.3 micrometer optical source, and the other is generated by a 1.5 micrometer optical source, such as a laser diode, for example. The WDMs are broadbanded, and typically provide a passband of 1.310+/−20 nm and 1.550 +/−20 nm (nanometers). In such systems, the use of an exact optical source wavelength for each of the modulated light signals is not necessary, provided that the wavelength of such signals falls within the 40 nm window regardless of time and temperature considerations. Optical sources for providing the necessary light carrier waves, and the 1.3/1.5 micrometer WDM's have wide availability in the marketplace. Known techniques for accomplishing such multiple light signal transmission through a single fiber utilize two wide passband windows to eliminate the requirement to select source wavelengths. Such known systems provide high performance as required in telecommunication applications, and are relatively economic.

In present fiber optic communications systems, a significant increase in cost and complexity is encountered when adding a third channel or modulated light signal for bidirectional transmission through a single fiber optic cable. Adding a fourth channel makes such a system even more costly and complex. Where systems require high performance, the use of a third wavelength window, such as provided by a 0.8 micrometer optical source is not acceptable due to the performance being below that required even as a minimum for a high performance system. The only known option for adding third and fourth communication channels to such a system providing high performance has been to slice either the 1.3 micrometer window or the 1.5 micrometer window into two windows, and to employ narrowband filters to combine and separate the added channels. In turn, a further requirement is that the optical sources must be selected to have a precise wavelength, in order to match the narrowband filters passband, which must also be maintained with the passage of time and over a relatively wide temperature range. As a result, such known systems are expensive, and very complex.

SUMMARY OF THE INVENTION

An object of the invention is to provide a fiber optical communication system capable of bidirectional transmission of pairs of modulated light signals having the same wavelength, and traveling in opposite directions over a single fiber at the same time.

Another object of the invention is to provide three or more channels for optical transmission over a single fiber, with bidirectional simultaneous transmission of at least two modulated light signals having the same wavelength from two respective channels.

With the problems of the prior art in mind, these and other objects of the invention are satisfied by combining at least two known two channel optical communication systems operating in a back-to-back configuration. In one embodiment, the present invention includes commonly available, high performance low-cost components operating at 1.3 micrometers and 1.5 micrometers, inexpensive broadband 1.3/1.5 micrometer WDM modulators, 1×2 optical splitter/combiners, and optical isolators, along with means for interconnecting the same in a configuration providing three or four channel transmission over a single optical fiber, whereby bidirectional simultaneous transmission of pairs of modulated light signals having the same wavelength, respectively, is obtained.

BRIEF DESCRIPTION OF THE DRAWINGS

Various embodiments of the present invention will now be described with reference to the drawings, in which like items are identified by the same reference designation, wherein.

DETAILED DESCRIPTION OF THE INVENTION

Figure 1:
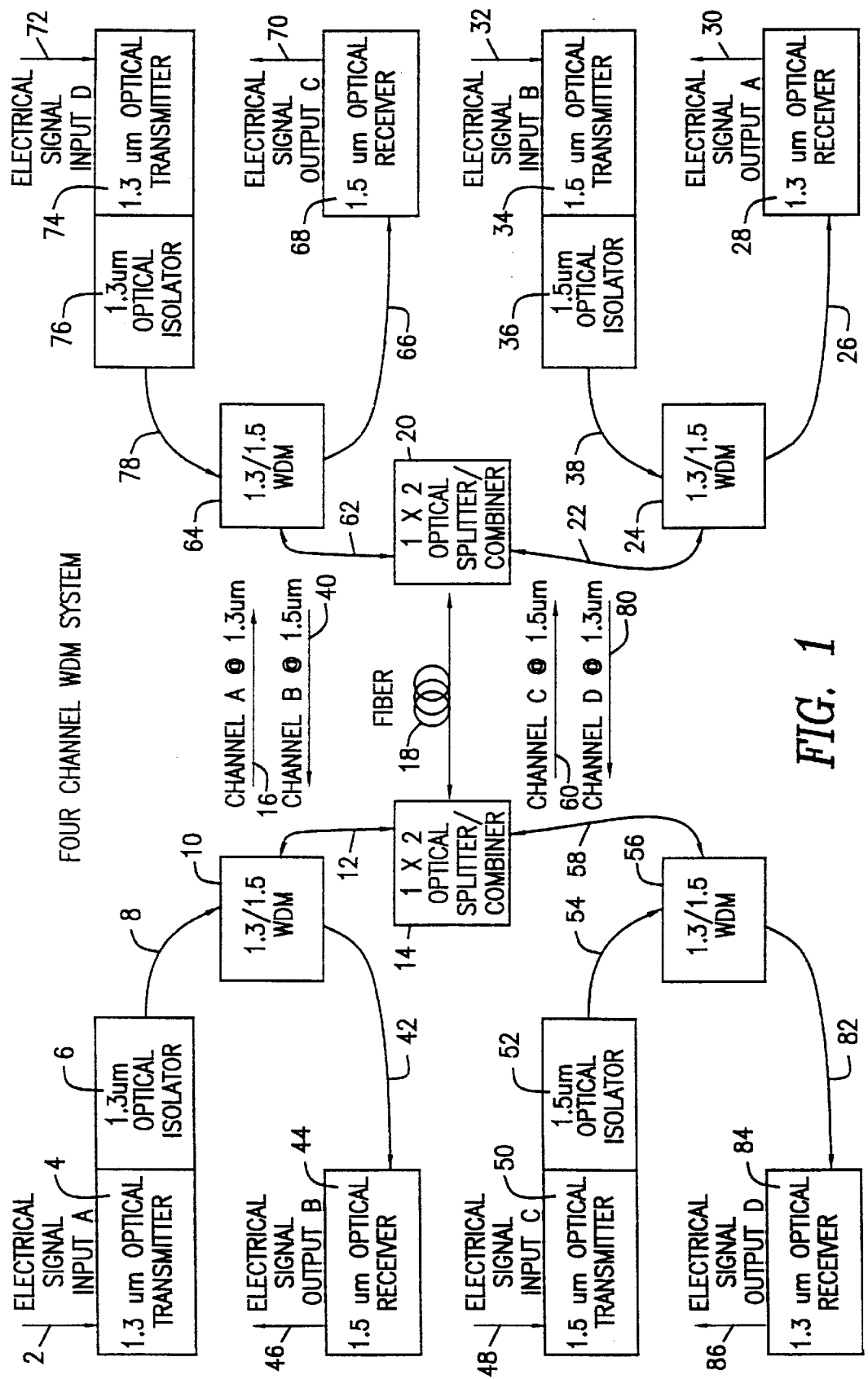
FIG. 1 shows a four channel WDM fiber optic communication system for one embodiment of the invention.

A first embodiment of the invention is shown in FIG. 1 for a four channel wave division multiplexer system. The system includes channels A, B, C, and D, respectively. Each of the aforesaid channels respectively receive an electrical input signal, either analog or digital in nature, respectively, and apply the electrical signal to an optical transmitter operating at a desired wavelength. The optical carrier signal of the associated transmitter is modulated by the associated electrical signal, and then passed through other components to be described for transmission over a single optical fiber 18, from which the signal is passed through yet other components to be described to an optical receiver receptive of optical signals having the same wavelength as the associated transmitter. The optical receiver converts the modulated optical signal back into an electrical signal, and outputs the same. In the embodiment of FIG. 1, optical signals for channels A and C are passed through optical fiber 18 in one direction, and optical signals for channels B and D are passed through the optical fiber in an opposite direction, respectively, as shown.

As previously mentioned, in known optical transmission systems, bidirectional simultaneous transmission of optical signals can be accomplished provided that the optical signals have different wavelengths. However, when in these known systems optical signals traveling simultaneously in opposite directions through a single fiber have the same wavelength, such signals are subject to being injected into an opposing transmitter, resulting in noise being injected into the optical signals in addition to distorting these signals. For example, in prior systems a transmitted optical signal of a given wavelength will arrive at the optical transmitter on the opposite end of the system that is operative to transmit an optical signal of the same wavelength in the opposite direction. In such known systems, particularly where laser light sources are employed, there are no means for preventing the simultaneously transmitted bidirectional optical signals having the same wavelength from destructively combining with one another to cause noise and distortion in the opposing transmitters at each end of the system. In the preferred embodiments of the invention as described herein, this problem in the prior art is overcome through the use of optical isolators in optimized systems using laser light sources, to permit the one way transmission of optical signals from a given transmitter, while blocking oppositely traveling optical signals of the same wavelength from reaching the associated opposing transmitter. In lower performance multichannel wave division multiplexer (WDM) systems for the various embodiments of the invention, using LED light sources, the optical isolators can be eliminated.

With further reference to the embodiment of FIG. 1, in the example shown, for channel A, an electrical input signal designated by arrow 2 is connected to the input of an optical transmitter 4 having a 1.3 micrometer (um) wavelength for the optical carrier signal, which is modulated by the electrical signal 2 that can be either a digital signal or an analog signal. An output signal from the optical transmitter 4 is coupled by either external or internal optical coupling, such as an optical fiber (not shown), for example, through a 1.3 micrometer optical isolator 6, and therefrom via an optical coupler 8 to a 1.3/1.5 um wave division multiplexer (WDM) 10. Note that the optical coupler 8, and all other optical couplers to be called out and described herein, are provided by conventional optical component coupling or interconnection means, such as fiber optical cables, individual fibers, atmospheric couplings, other dielectric light conductors, for example, but are not limited thereto. The optical signal is passed from WDM 10 via a bidirectional optical coupling 12 to a 1×2 optical splitter/combiner 14, and therefrom through a single optical fiber 18 to another 1×2 optical splitter/combiner 20 on the other side of the present system. Note that the optical signal flow path for channel A operating at 1.3 um is indicated by arrow 16. The channel A optical signal is passed from optical splitter/combiner 20 through an optical coupler 22 into a 1.3/1.5 WDM 24, and therefrom through an optical coupler 26 to a 1.3 urn optical receiver 28. Optical receiver 28 converts the optical signal into an electrical signal output A designated by arrow 30. Note that the 1.3 um and 1.5 um wavelengths are given for purposes of illustration only, and are not meant to be limiting. Any other suitable wavelength can be used with appropriate selection of components for the chosen wavelengths.

With further reference to FIG. 1, channel D can be operated to pass a 1.3 um optical signal designated by arrow 80 through optical fiber 18 in the opposite direction to that of the optical signal 16 of channel A of the same wavelength in a simultaneous manner. As shown in this example, channel D includes a 1.3 um optical transmitter 74 for receiving an electrical signal input D designated by arrow 72. Transmitter 74 operates to pass the optical signal modulated by the associated electrical signal 72 to a 1.3 um optical isolator 76, and therefrom through the series connected optical path including in succession optical coupler 78, 1.3/1.5 WDM 64, bidirectional optical coupler 62, 1×2 optical splitter/combiner 20, single fiber 18, 1×2 optical splitter/combiner 14, bidirectional optical coupler 58, 1.3/1.5 WDM 56, optical coupler 82, and into 1.3 um optical receiver 84. The optical receiver 84 converts the optical signal of channel D designated by arrow 80 into an electrical signal output D designated by arrow 86, as shown.

The system further provides for the simultaneous bidirectional transmission of an optical signal designated as arrow 40 for channel B operating at 1.5 um wavelength, and a fourth optical signal traveling in the opposite direction to that of optical signal 40 through channel C, the fourth signal being designated by arrow 60 and also having a wavelength of 1.5 um.

As with channels A and D, the simultaneous bidirectional transmission of signals of the same wavelength through channels B and C is accomplished in a similar manner with the system providing for the simultaneous transmission of all four signals 16, 40, 60, and 80, without interference. More specifically, channel B includes the series connection of a 1.5 um optical transmitter 34 for receiving an electrical signal input B designated by arrow 32, a resultant optical signal being optical coupled to a 1.5 um optical isolator 36, therefrom through optical coupler 38 to 1.3/1.5 WDM 24, through bidirectional optical coupler 22, through 1×2 optical splitter/combiner 20, single fiber 18, 1×2 optical splitter/combiner 14, optical coupler 12, 1.3/1.5 WDM 10, optical coupler 42, and therefrom to 1.5 um optical receiver 44 for converting the optical signal 40 back into an electrical signal output B designated by arrow 46.

Lastly, channel C provides for transmission in the opposite direction to that of channel B of a 1.5 um optical signal 60, via the series connection of a 1.5 um optical transmitter 50 for receiving an electrical input signal C designated by arrow 48, and passing the resultant optical signal via an optical coupler (not shown) to a 1.5 um optical isolator 52, and therefrom through the series connection of optical coupler 54, 1.3/1.5 WDM 56, bidirectional optical coupler 58, 1×2 optical splitter/combiner 14, single optical fiber 18, 1×2 optical splitter/combiner 20, optical coupler 62, 1.3/1.5 WDM 64, optical coupler 66, and 1.5 um optical receiver 68. The optical receiver 68 converts the optical signal 60 back into an electrical signal output C as designated by arrow 70.

Figure 2:
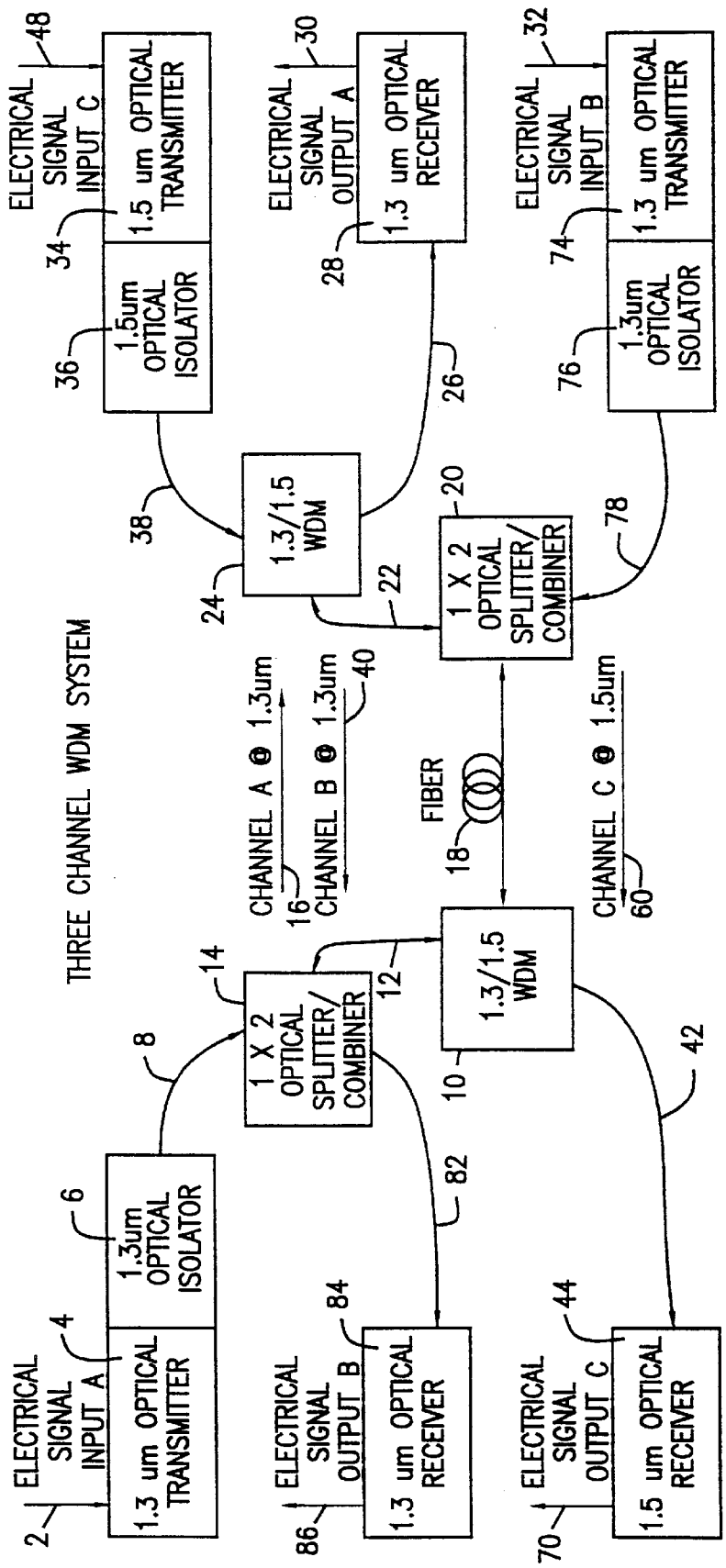
FIG. 2 shows a three channel WDM fiber optic communication system for another embodiment of the invention.

In a similar manner, a three channel WDM system can be provided, as shown in FIG. 2, with many of the same components as illustrated in the four channel system of FIG. 1 being utilized. More specifically, in the system of FIG. 2, channels A and B each provide for the transmission of optical signals 16, 40, respectively, each having a 1.3 um wavelength, but in opposite directions or bidirectionally. The transmission can occur simultaneously without interference through the single optical fiber 18. The system further provides for the transmission in one direction of a 1.5 um optical signal designated as arrow 60 for channel C, as shown. Note that for the series connected components of channel A, the system to the left side of optical fiber 18 is substantially the same as that of the four channel system of FIG. 1 on the left side of optical fiber 18. More specifically, the transmission side components for channel A are the same as those for the four channel system in FIG. 1, except for switching the positions of the WDM 10 and optical splitter/combiner 14, as shown.

With further reference to FIG. 2, for channel B, the series connected components include as shown from the right side of single fiber 18, a 1.3 um optical transmitter 74 for receiving an electrical signal input B designated by arrow 32, the transmitter 74 being optically coupled to a 1.3 um optical isolator 76, and therefrom in series successively to optical couplers 78, 1×2 splitter/combiner 20, single optical fiber 18, 1.3/1.5 WDM 10, bidirectional optical coupler 12, 1×2 optical splitter/combiner 14, optical coupler 82, and 1.3 um optical receiver 84. Receiver 84 operates to convert the associated optical signal represented by arrow 40 into an electrical signal output B designated as arrow 86.

With still further reference to FIG. 2, channel C transmits a 1.5 um optical signal as designated by arrow 60 through the system via the series connected components including beginning from the right side or transmission side of optical fiber 18 for channel C, 1.5 um optical transmitter 34 for receiving electrical signal input C designated by arrow 48, 1.5 um optical isolator 36, optical coupling 38, 1.3/1.5 WDM 24, bidirectional optical coupler 22, 1×2 optical splitter/combiner 20, single optical fiber 18, 1.3/1.5 WDM 10, optical coupler 42, and 1.5 um optical receiver 44. Optical receiver 44 operates to convert the optical signal 60 into an electrical signal output C as designated by arrow 70.

Many other configurations, incorporating most of the components of the system of FIG. 1, can be utilized for providing other three and four channel WDM systems. For example, in FIG. 3 an alternative three channel WDM system is shown for providing for the bidirectional simultaneous transmission of channels A and C each having a 1.3 um associated optical signals as designated by arrows 16, 60, respectively. Channel B provides for the transmission of a 1.5 um optical signal as designated by the arrow 40.

Figure 4:
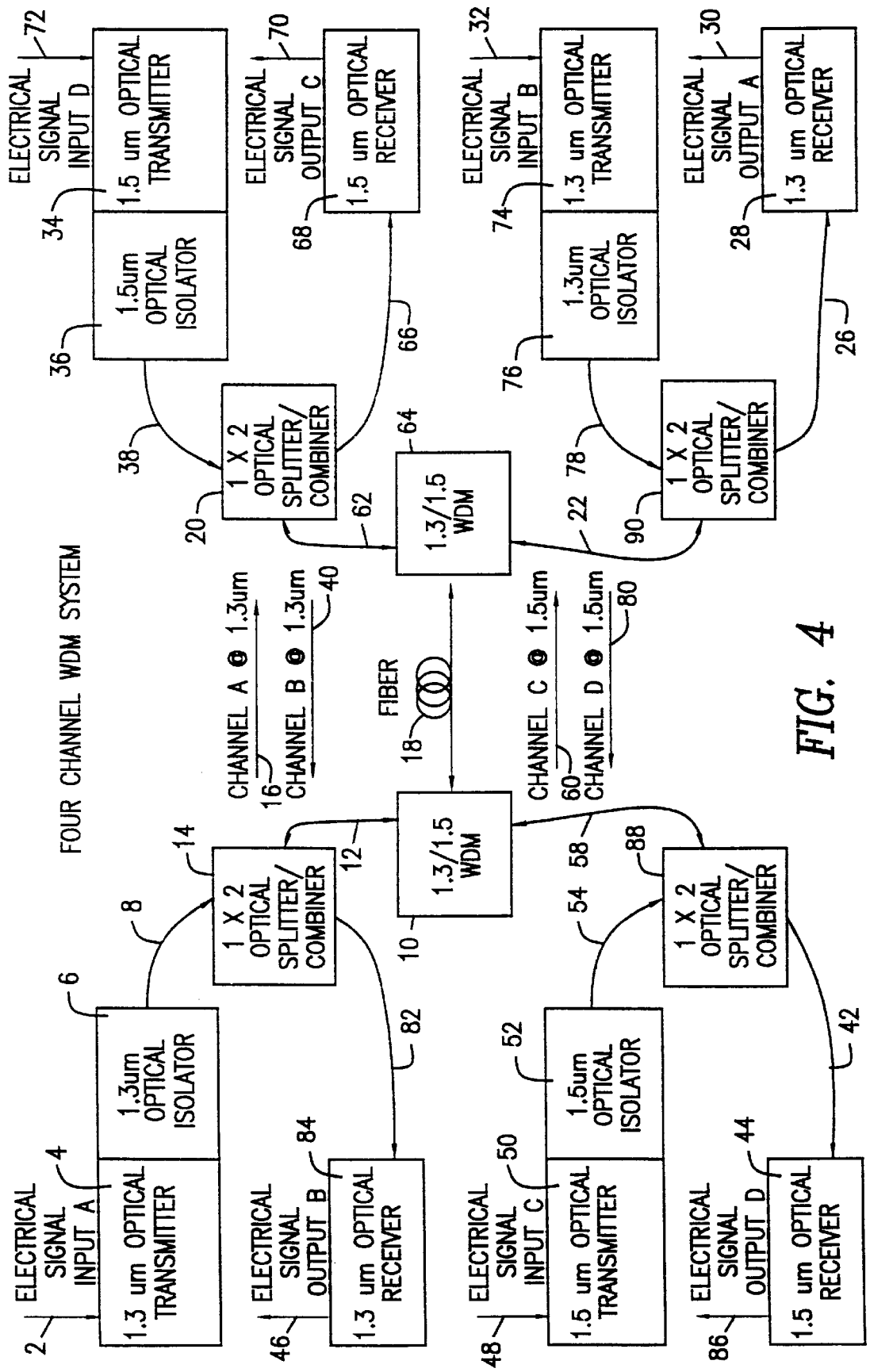
FIG. 4 shows an alternative embodiment for a four channel WDM fiber optic communication system.

In FIG. 4, an alternative embodiment of the invention for a four channel WDM system is shown. Relative to the four channel system of FIG. 1, WDM 56 and WDM 24 have been eliminated, and 1×2 optical splitter/combiners 88 and 90 have been added, with other components as shown in FIG. 4 being substantially the same as those of FIG. 1. With the components connected as shown in FIG. 4, and signal inputs and outputs modified as shown in comparison to the configuration of FIG. 1, this alternative embodiment provides for the simultaneous bidirectional transmission of 1.3 um optical signals through single optical fiber 18 in channels A and B, as designated by arrows 16 and 40 respectively, simultaneous with the bidirectional transmission of 1.5 um optical signals designated by arrows 60 and 80 for channels C and D, respectively.

Figure 5:
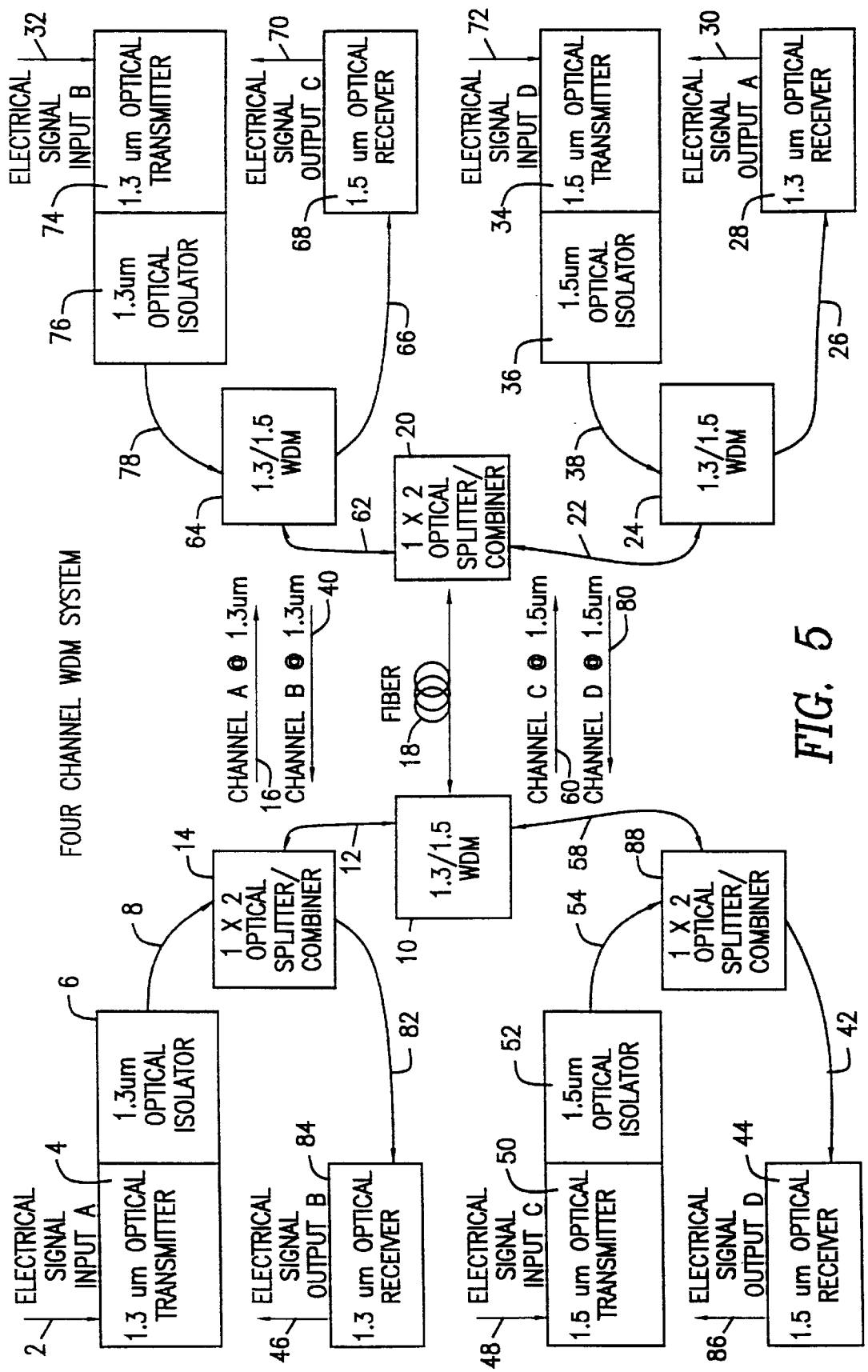
FIG. 5 shows another alternative embodiment for a four channel WDM fiber optic communication system.

In FIG. 5, a third alternative embodiment for a four channel WDM system is shown. Relative to the four channel system of FIG. 1, the system of FIG. 5 does not include WDM 56, and further includes a third optical splitter/combiner 88. Otherwise, the remaining components of FIG. 5 are substantially the same as those of FIG. 1, but are arranged in different series paths for channels A–D, respectively, as shown. In this configuration, the optical signals designated by arrows 16 and 40 for channels A and B, respectively, each have 1.3 um wavelengths and are traveling in opposite directions through the single optical fiber 18. Also, at the same time the system is further capable of providing the simultaneous bidirectional transmission of optical signals designated by arrows 60 and 80 for channels C and D, respectively, having 1.5 um wavelengths and traveling in opposite directions, as shown. As will be known to one of skill in the art, for each one of the embodiments of the invention previously described, and yet to be described, any one or combination of the channels of a given embodiment can be operative at the same time or at different times. In the configuration of FIG. 5, the four channels shown are capable of being operative at the same time.

Figure 6:
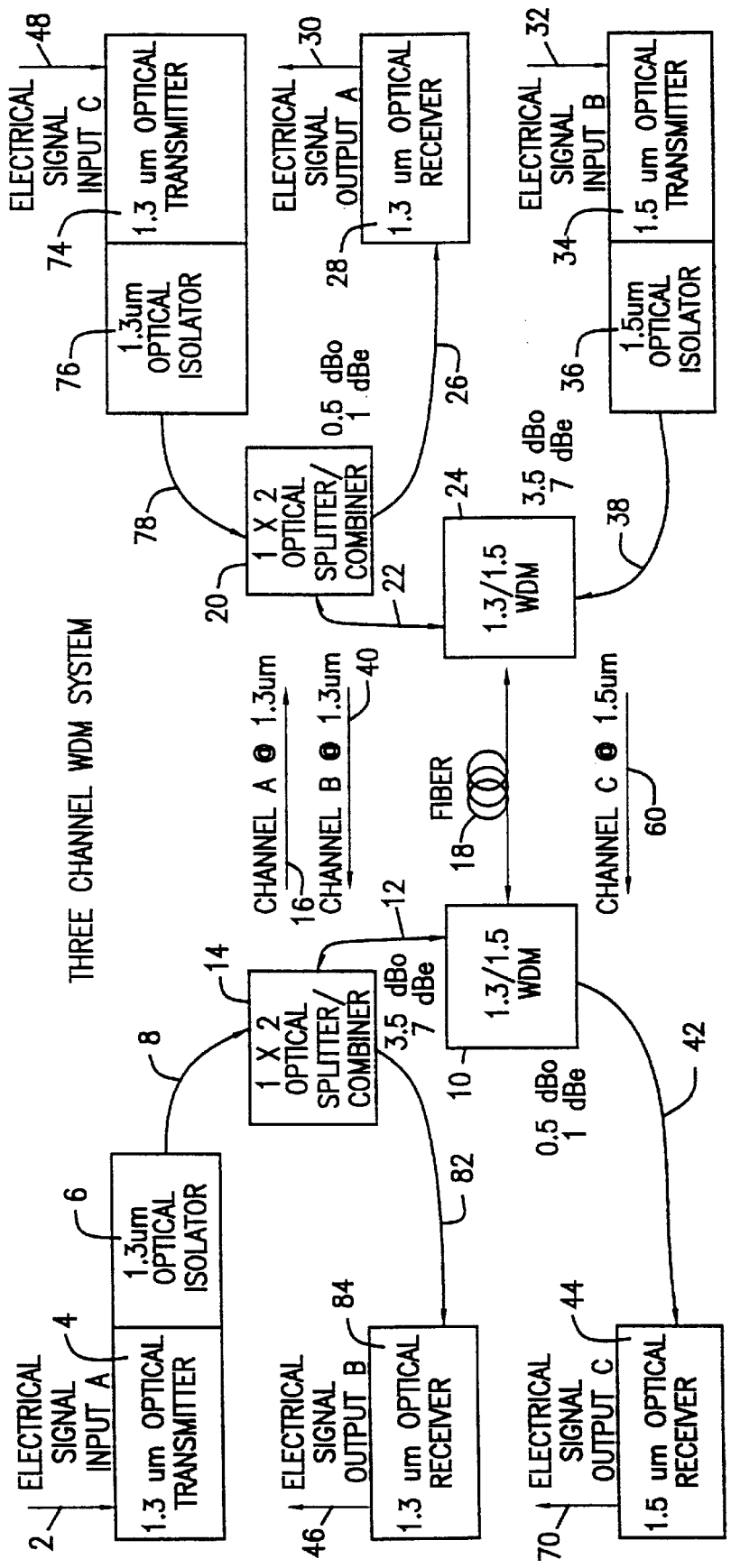
FIG. 6 shows another embodiment of the invention for a three channel WDM fiber optic communication system.

In FIG. 6, a third embodiment for a three channel WDM system is shown. In comparison to the three channel WDM system embodiment of FIG. 2, the components are arranged in identical manner on the left side of the single fiber 18, but are different on the right side. More specifically, electrical signal B designated by arrow 32 is now connected to the 1.5 um optical transmitter 34, instead of transmitter 74 as in FIG. 2. Also, the electrical signal input C designated by arrow 48 is now connected to optical transmitter 74, instead of transmitter 34 as in the configuration of FIG. 2. Also, the input of optical receiver 28 is now connected via optical coupler 26 to optical splitter/combiner 20, instead of the 1.3/1.5 WDM 24 as in FIG. 2. Also, the WDM 24 and optical splitter/combiner 20 are reversed in position, with WDM 24 being connected to the single optical fiber 18 in this third embodiment for the three channel WDM system. Otherwise, relative to the embodiment of FIG. 2, channels A through C each conduct optical signals in the same direction with the same wavelengths with each channel, respectively, as shown in the embodiments of FIGS. 2 and 6.

Figure 7:
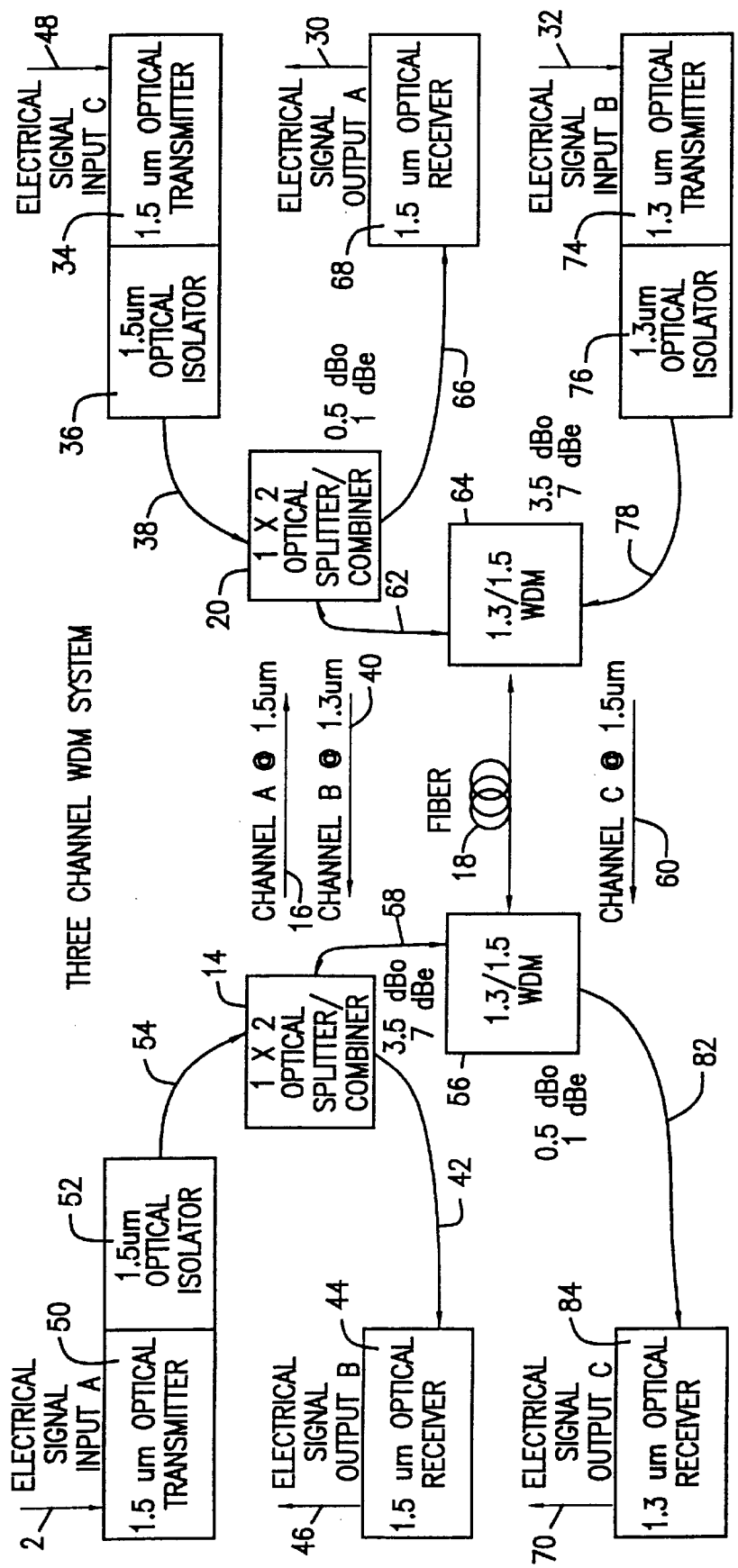
FIGS. 7 and 8 show third and fourth alternative embodiments, respectively, for a three channel WDM fiber optic communication system.
Figure 8:
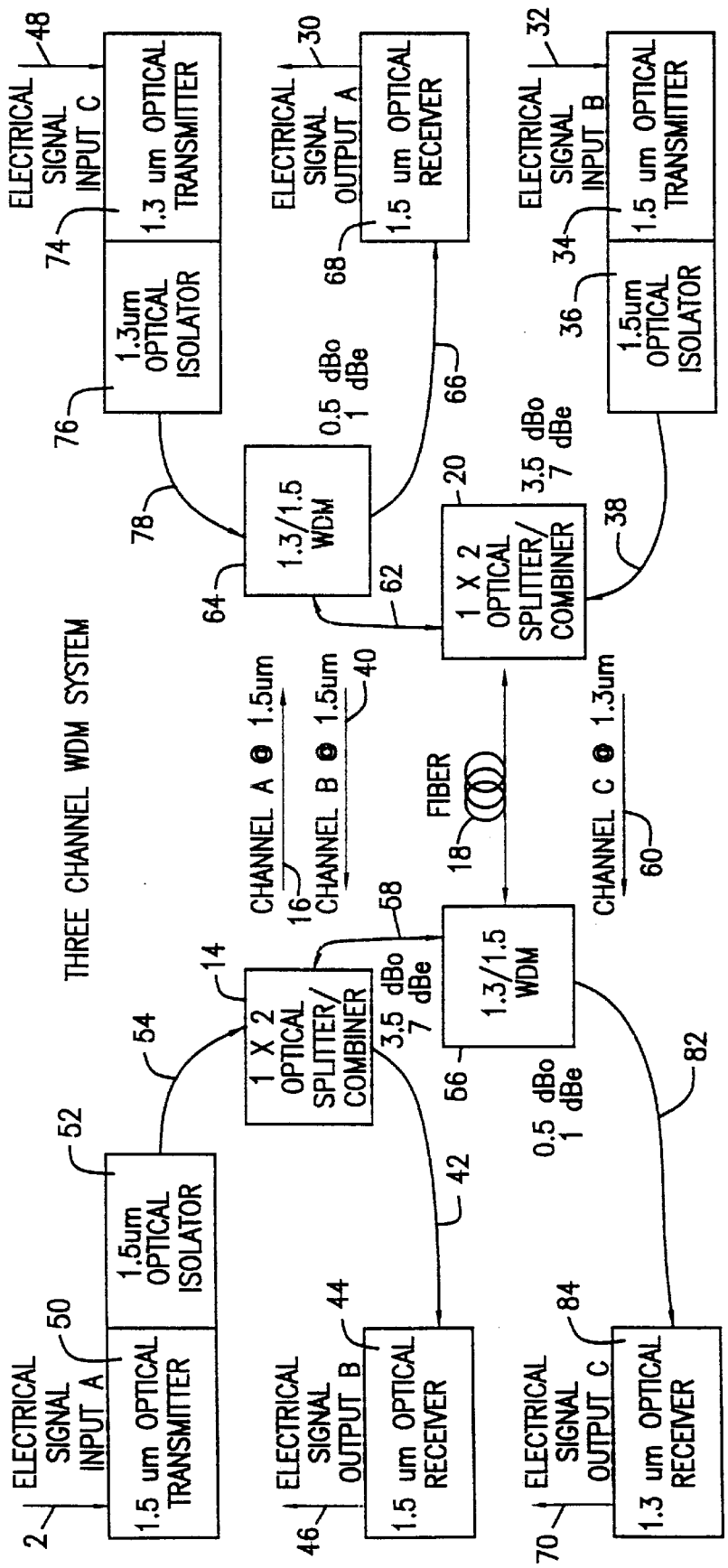

In FIGS. 7 and 8, yet other alternative embodiments of the invention for providing a three channel WDM system are shown. In the embodiment of FIG. 7, relative to other of the embodiments, signal inputs and outputs have been rearranged, as have the component combinations, to provide for simultaneous bidirectional transmission in channels A and C of 1.5 um wavelength optical signals, along with channel B transmitting an optical signal of 1.3 um wavelength in the same direction as the 1.5 um optical signal channel C as shown. The embodiment of FIG. 7 differs from the embodiment of FIG. 2, in that the embodiment of FIG. 7 includes an optical signal of wavelength 1.5 um in channels A instead of 1.3 um as in FIG. 2. Accordingly, the signal inputs and signal outputs as shown are different in order to accomplish this result. Also, the positioning of the optical splitter/combiner 20 in each embodiment, and the positioning of the WDM 24 in the embodiment of FIG. 2 relative to the WDM 64 in the embodiment of FIG. 7 are different relative to the various series connected components for each respective channel A through C, as shown. Similar comments apply in comparing the embodiment of FIG. 8 to the embodiment of FIG. 2.

As indicated previously, the use of the optical isolators as shown in various of the embodiments of the invention for preventing an optical signal transmitted from one end of the system to the other from interfering with the transmission from an optical transmitter of the same wavelength at the other end of the system is critical to the optimum operation of the subject invention, particularly when laser light sources are modulated by analog signals. It is believed that one of skill in the art will also recognize that there are many other configurations of the components than those shown for providing three and four channel WDM systems in which bidirectional transmission of at least one pair of optical signals having the same wavelength can be accomplished, are possible to be provided.

In engineering prototypes assembled to test various configurations of the present invention, the 1.3 um optical transmitters 4 and 74 were part number AC 106 manufactured by Anacom Systems Corporation, New Brunswick, N.J. The 1.3 um optical receivers 84 and 28 were each part number AC106LN (LN means low noise of Anacom Systems Corporation. In the present invention, to overcome the optical signal losses of various components, such as the optical splitter/combiners 14, 20, 88, and 90, it is important to use a low noise receiver. The AC106LN is a very low noise transimpendance receiver that improves the signal to noise ratio by about 10 dB relative to the use of standard known resistively matched receivers. Also, this receiver (or a comparable low noise receiver) in combination with other components of the system, as claimed, provides for instantaneous simultaneous full bandwidth bidirectional transmission and reception of the optical signals. This provides for passing all frequencies without band limiting. The 1.3 um optical isolators 6 and 76 were provided by part number PIFI-51 manufactured by E-TEK Dynamics, San Jose, Cali. The 1.5 um optical transmitters were provided by part number AC106-1.5 manufactured by the previously mentioned Anacom Systems Corporation, as were the 1.5 um optical receivers 44 and 70. The 1.5 um optical isolators 52 and 36 were provided by part number PIFI-21 manufactured by the previously mentioned E-TEK Dynamics. The 1.3/1.5 WDM components 10, 24, 56, and 64, were provided by part number S008952 manufactured by Alcoa Fujikura Ltd., Spartenburg, S.C. Lastly, the optical splitter/combiners 14, 20, 88, and 90 were provided by part number S006770 manufactured by the previously mentioned Alcoa Fujikura Ltd.

Figure 9:
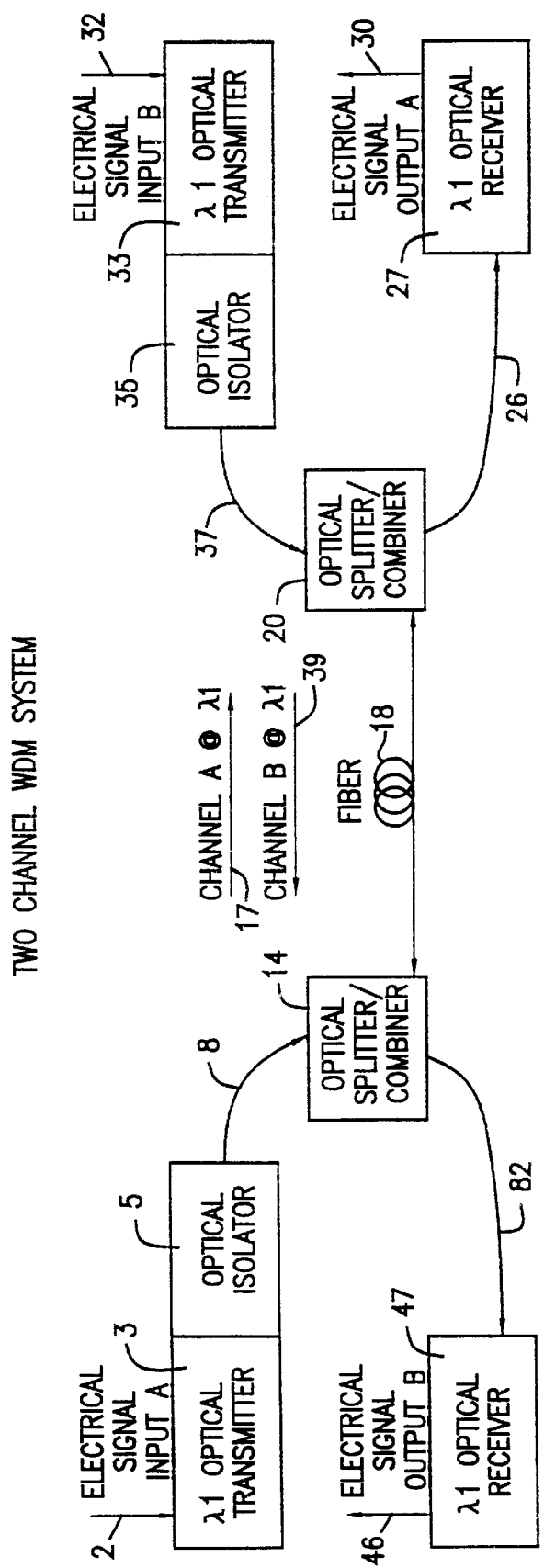
FIG. 9 shows a generalized two channel WDM fiber optic communication system for another embodiment of the invention.

In FIG. 9, a generalized two channel WDM system for another embodiment of the invention is shown. In this embodiment, two channels 17 and 39, for channels A and B, respectively, each for transmitting and receiving modulated light signals having a wavelength $\lambda_1$ as shown, channel A includes an optical transmitter 3 for receiving an electrical signal Input A designated by arrow 2. The output signal from the optical transmitter 3 is passed through an optical isolator 5, and therefrom via an optical coupler 8 to an optical splitter/combiner 14. The optical splitter/combiner 14 transfers the signal from optical coupler 8 onto an optical fiber 18 for transmission to another optical splitter/combiner 20, and therefrom via optical coupler 26 to an optical receiver 27. The optical receiver 27 converts the modulated light signal into an electrical signal Output A as designated by the arrow 30. Further as shown, the system is capable of simultaneously transmitting another modulated light signal through Channel B having a wavelength also of $\lambda_1$, as designated by arrow 39. Channel B includes the series connection of an optical transmitter 33 receptive of an electrical signal Input B designated by arrow 32, for driving an optical isolator 35, the output of which is coupled via optical coupler 37 to the optical splitter/combiner 20. For Channel B, the output of the optical splitter/combiner 20 is applied to the optical fiber 18 for transmitting the Channel B light signal 39 in the opposite direction along fiber 18 as that of the signal 17 of Channel A, to an optical splitter/combiner 14. As for other embodiments, the Channel A and Channel B signals can be transmitted through optical fiber 18 at the same time. For Channel B the output of the optical splitter/combiner 14 is coupled via optical coupler 82 to an optical receiver 47, for conversion into an electrical output signal B designated by arrow 46. As with other embodiments of the invention, the electrical signal inputs A and B can be analog or digital signals.

Figure 3:
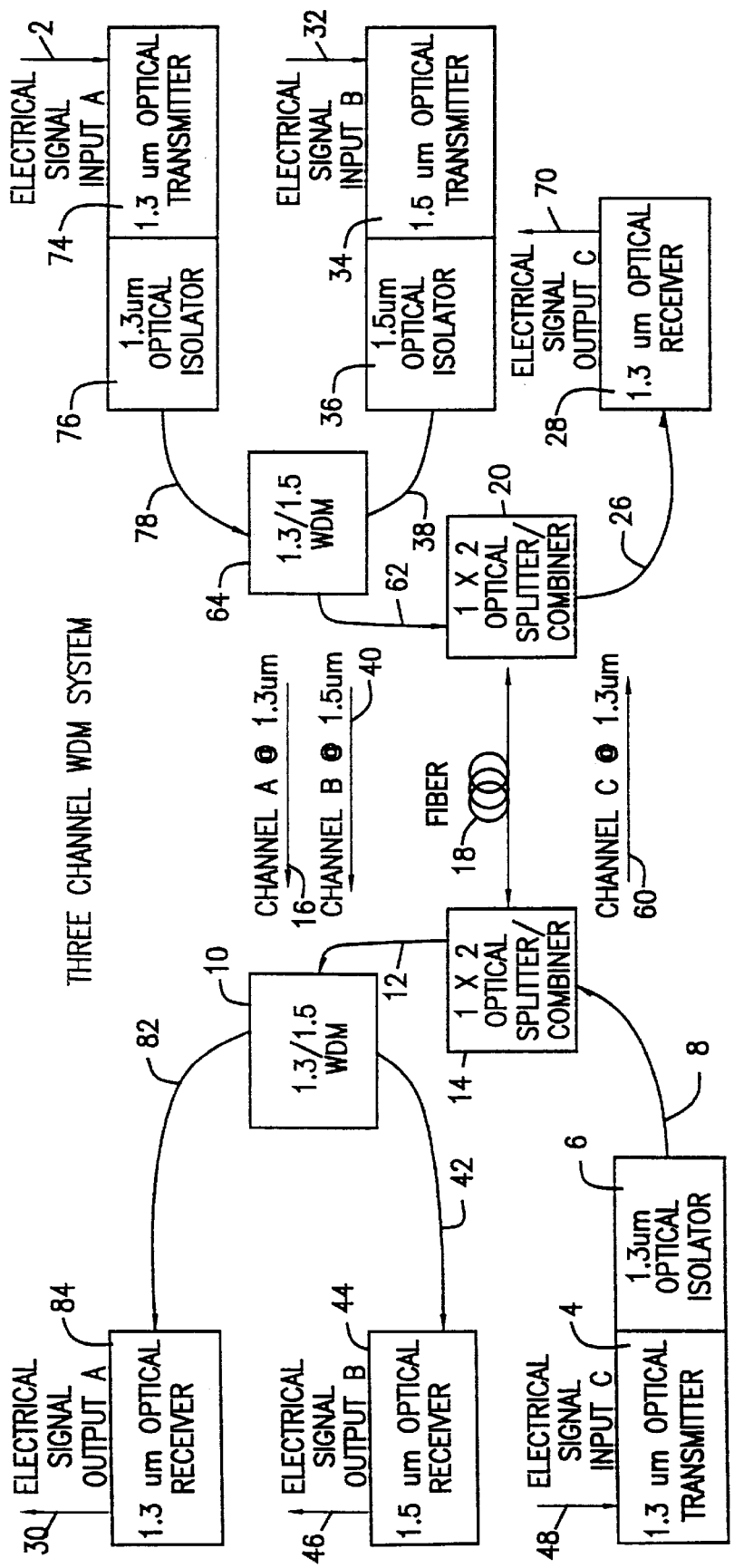
FIG. 3 shows a three channel WDM fiber optic communication system for yet another embodiment of the invention.

In further reference to the embodiments of the invention of FIGS. 1–9, each configuration for a given number of channels may have certain advantages relative to another light channel configuration. For example, for the various three channel system configurations shown, the configuration of FIG. 3 provides substantially equal optical loss on each of the three channels incorporated therein, thereby providing certain advantages in various applications, and perhaps facilitating production of the system. Also, the three channel configuration or embodiment of FIG. 2 provides unequal optical losses comparing each channel to the other, but has an advantage that Channel C thereof provides a lower optical loss than that obtained in other configurations or embodiments of the invention, which in certain applications may be an advantage. Consideration may also be given to various other trade-offs and performance between the various configurations, such as relative loss between channels and co-channel signal cross talk, and so forth. Accordingly, the requirements of a specific application will dictate which embodiment of the invention, as shown and described herein, should be pursued.

In summary, the present invention in its various embodiments as described above, provides a multichannel wave division multiplex system for optical systems, for the simultaneous bidirectional transmission of three of four optical signals through a single fiber. At least one pair of the optical signals that are bidirectionally traveling at the same time can have the same wavelength without creating any noise of distortion in either of the signals due to interference therebetween or at their associated optical transmitters. In the four channel system, all four optical signals can be transmitted or traveling at the same time, with one pair of signals having the same wavelength relative to one another, and the other pair of signals having the same wavelength relative to each other, but different from the wavelength of the first pair of signals. Compared to prior systems, the present invention eliminates the need for expensive and complex narrowband optical filters. Also, the present system is not critically dependent upon the wavelength of the optical signals, thereby eliminating the need in prior systems for optical sources having precisely tuned wavelengths, which greatly increase the expense of such systems. Also, compared to prior systems, the present system does not require complex and expensive circuitry for maintaining precise control over the wavelength of the optical signals for wide temperature ranges, and long time stability. The present invention only requires commercially available low cost components, yet provides a high performance multichannel optical WDM system in each of its various embodiments, with minimal component count for further reducing the cost, and maintaining high reliability.

Although various embodiments of the invention have been shown and described herein, they are not meant to be limiting. Those of skill in the art may recognize various modifications to these embodiments, which modifications are meant to be covered by the spirit and scope of the appended claims. For example, the single optical fiber 18 can be provided by a single fiber of a fiber optic cable having multiple fibers, or having only a single fiber. Also, if optimum performance is not required, in a number of the previously described embodiments of the invention, certain optical isolators can be eliminated to save cost and simplify the system. As an example, where LED light sources are employed, the optical isolators can be eliminated. More specifically, in the embodiment of FIG. 3, optical isolator 36 can be eliminated in that only one optical signal having a wavelength of 1.5 um is transmitted in the system. In the embodiment of FIG. 4, the optical isolators 6, 36, 52, and 76 are each optional, in that the system configuration otherwise provides sufficient isolation for each of the optical transmitters 6, 34, 50, and 74, to permit satisfactory operation in many less demanding applications. Similar comments apply to the embodiment of FIG. 5. In the embodiment of FIG. 6, the optical isolator 76 is optional depending upon the system application or expected level of performance. Similar comments apply to the embodiment of FIG. 8.

What is claimed is:

1. A multichannel wave division multiplexer (WDM) system operable for simultaneously transmitting individual optical carriers capable of being modulated with broadband non-band limited electrical signals bidirectionally through a single fiber, wherein at least one pair of the oppositely traveling optical carriers can have the same wavelength, comprising:
- a fiber optic cable having a first end and an opposing second end;
- a first laser transmitter for transmitting an analog or digital first electrical signal, for converting the first electrical signal into a first optical signal having a first wavelength;
- first optical coupling means connected between said first laser transmitter and said first end of said fiber optic cable, for coupling said first optical signal to said first end of said fiber optic cable;
- a second laser transmitter for transmitting an analog or digital second electrical signal for conversion into a second optical signal having said first wavelength;
- second optical coupling means connected between said second laser transmitter and said second end of said fiber optic cable, for coupling said second optical signal to said second end of said fiber optic cable;
- said first optical coupling means including a unidirectional first optical isolator of said first wavelength connected to said first laser transmitter, for optically isolating said first laser transmitter both from said second optical signal and from optical signals of wavelengths other than said first wavelength;
- said second optical coupling means including a unidirectional second optical isolator of said first wavelength connected to said second laser transmitter, for optically isolating said second laser transmitter both from said first optical signal and from optical signals of wavelengths other than said first wavelength; and
- first and second very low noise optical receivers of said first wavelength coupled to said second and first ends of said fiber optic cable, respectively, for receiving said first and second optical signals, respectively.

2. The multichannel WDM system of claim 1, wherein said fiber optic cable consists of a single fiber.

3. The multichannel WDM system of claim 1, wherein said fiber optic cable consists of a plurality of optical fibers, only one of which is connected to said system.

4. The multichannel WDM system of claim 1, wherein said first and second optical receivers convert said first and second optical signals back into said first and second electrical signals, respectively.

5. The multichannel WDM system of claim 1, operable for simultaneously transmitting said first and second optical signals, along with a third optical signal, said system further including:
- a third laser transmitter for transmitting an analog or digital third electrical signal for conversion into said third optical signal having a second wavelength;
- third optical coupling means connected between said third laser transmitter and one of said first and second ends of said fiber optic cable, for coupling said third optical signal thereto;
- said third optical coupling means including a unidirectional third optical isolator of said second wavelength connected to said third laser transmitter for isolating it both from optical signals of said second wavelength and of other wavelengths; and
- a third optical receiver coupled to the other of said first and second ends of said fiber optic cable, for receiving said third optical signal.

6. The multichannel WDM system of claim 5, additionally operable for simultaneously transmitting said first, second, and third optical signals alone with a fourth optical signal, said third and fourth optical signals traveling in opposite directions through said fiber optic cable, said system further including:
- a fourth laser transmitter for transmitting an analog or digital fourth electrical signal for conversion into said fourth optical signal having said second wavelength;
- fourth optical coupling means connected between said fourth laser transmitter and the other of said first and second ends of said fiber optic cable, for coupling said fourth optical signal thereto;
- said fourth optical coupling means including a fourth optical isolator connected to said fourth laser transmitter of said second wavelength for optically isolating said fourth laser transmitter both from said third optical signal and from optical signals of wavelengths other than said second wavelength; and
- a fourth optical receiver coupled to the one of said first and second ends of said fiber optic cable, for receiving said fourth optical signal.

7. The multichannel WDM system of claim 6, wherein said third and fourth optical receivers convert said third and fourth optical signals, respectively, back into said third and fourth electrical signals, respectively.

8. The multichannel WDM system of claim 1, wherein said first and second optical isolators are directly connected to said first and second laser transmitters, respectively.

9. The multichannel WDM system of claim 6, wherein said first through fourth optical isolators are directly connected said to first through fourth laser transmitters, respectively.

10. The multichannel WDM system of claim 6, wherein said fiber optic cable consists of a single fiber.

11. The multichannel WDM system of claim 6, wherein said fiber optic cable consists of a plurality of optical fibers, only one of which is connected to said system.

12. The multichannel WDM system of claim 5, further including:
- said first optical coupling means further including:
  - a first optical splitter/combiner connected to said first optical isolator; and
  - a first WDM connected between said first optical splitter/combiner and the first end of said fiber optic cable;
  - said first optical splitter/combiner also being connected to said second optical receiver for coupling the latter via said first WDM to the first end of said fiber optic cable;
  - said first WDM also being connected to said third optical receiver for coupling the latter to the first end of said fiber optic cable;
- said second optical coupling means further including:
  - a second optical splitter/combiner connected to said second optical isolator; and
  - a second WDM connected between said second optical splitter/combiner and the second end of said fiber optic cable;
  - said second optical splitter/combiner also being connected to said first optical receiver for coupling the latter via said second WDM to the second end of said fiber optic cable; and
- said third optical coupling means further including said second WDM connected to said third optical isolator for connecting the latter to the second end of said fiber optic cable.

13. The multichannel WDM system of claim 1, further including:
   said first optical coupling means further including:
      a first optical splitter/combiner connected to said first optical isolator; and
      a first WDM connected between first optical splitter/combiner and the first end of said fiber optic cable;
      said first optical splitter/combiner also being connected to said second optical receiver for coupling the latter via said first WDM to the first end of said fiber optic cable; and
   said second optical coupling means further including:
      a second optical splitter/combiner connected to said second optical isolator; and
      a second WDM connected between said second optical splitter/combiner and the second end of said fiber optic cable;
      said second optical splitter/combiner also being connected to said first optical receiver for coupling the latter via said second WDM to the second end of said fiber optic cable.

14. The multichannel WDM system of claim 5, further including:
   said first optical coupling means further including:
      a first optical splitter/combiner connected to said first optical isolator; and
      a first WDM connected between first optical splitter/combiner and the first end of said fiber optic cable;
      said first optical splitter/combiner also being connected to said second optical receiver for coupling the latter via said first WDM to the first end of said fiber optic cable;
   said second optical coupling means further including:
      a second optical splitter/combiner connected to said second optical isolator; and
      a second WDM connected between said second optical splitter/combiner and the second end of said fiber optic cable;
      said second optical splitter/combiner also being connected to said first optical receiver for coupling the latter via said second WDM to the second end of said fiber optic cable; and
   said third optical coupling means further including:
      a third optical splitter/combiner connected between said third optical isolator and said first WDM; and
      a fourth optical splitter/combiner connected between said second WDM and said third optical receiver, for coupling the latter to the second end of said fiber optic cable.

15. The multichannel WDM system of claim 6, further including:
   said first optical coupling means further including:
      a first optical splitter/combiner connected to said first optical isolator; and
      a first WDM connected between first optical splitter/combiner and the first end of said fiber optic cable;
      said first optical splitter/combiner also being connected to said second optical receiver for coupling the latter via said first WDM to the first end of said fiber optic cable;
   said second optical coupling means further including:
      a second optical splitter/combiner connected to said second optical isolator; and
      a second WDM connected between said second optical splitter/combiner and the second end of said fiber optic cable;
      said second optical splitter/combiner also being connected to said first optical receiver for coupling the latter via said second WDM to the second end of said fiber optic cable; and
   said third optical coupling means further including:
      a third optical splitter/combiner connected between said third optical isolator and said first WDM; and
      a fourth optical splitter/combiner connected between said second WDM and said third optical receiver, for coupling the latter to the second end of said fiber optic cable; and
   said fourth optical receiver being connected to said third optical splitter/combiner for coupling via said first WDM to the first end of said fiber optic cable;
   said fourth optical coupling means further including said fourth optical splitter/combiner and said second WDM connected in series between said fourth optical isolator and the second end of said fiber optic cable.

16. In a multichannel wave division multiplexer (WDM) system, a method for permitting the simultaneous bidirectional transmitting of at least first and second optical carriers capable of being modulated with broadband non-band limited electrical signals through a single optical fiber, wherein said first and second optical carriers have the same wavelength, comprising the steps of:
   applying a first electrical signal to a first laser transmitter for converting the signal into a first optical signal having a first wavelength;
   coupling said first optical signal to one end of said optical fiber;
   applying a second electrical signal to a second laser transmitter for converting the signal into a second optical signal having said first wavelength;
   coupling said second optical signal to another end of said optical fiber;
   optically isolating said first laser transmitter from said second optical signal, and signals of said first wavelength and other wavelengths, via a unidirectional first optical isolator of said first wavelength;
   optically isolating said second laser transmitter from said first optical signal, and signals of said first wavelength and other wavelengths, via a unidirectional second optical isolator of said first wavelength;
   coupling a first optical receiver to said one end of said optical fiber, for receiving said second optical signal; and
   coupling a second optical receiver to said other end of said single optical fiber, for receiving said first optical signal.

17. The method of claim 16, further including the steps of:
   applying a third electrical signal to a third laser transmitter for converting the signal into a third optical signal having a second wavelength;
   optically isolating said third laser transmitter from optical signals of said second and other wavelengths, via a unidirectional third optical isolator of said second wavelength;
   coupling said third optical signal to said one end of said optical fiber, for permitting simultaneous transmission with said first and second signals; and
   coupling a third optical receiver to said another and of said optical fiber for receiving said third optical signal.

18. The method of claim 17, further including the steps of:
   applying a fourth electrical signal to a fourth laser transmitter for converting the signal into a fourth optical signal having said second wavelength;

coupling said fourth optical signal to said another end of said optical fiber, for permitting simultaneous transmission with any one or combination of said first, second, and third optical signals;

optically isolating said fourth laser transmitter from said third optical signal, and signals of said second wavelength and other wavelengths via a unidirectional fourth optical isolator of said second wavelength; and coupling a fourth optical receiver to said one end of said optical fiber for receiving said fourth optical signal.

* * * * *